(12) United States Patent
Shatdal

(10) Patent No.: US 6,505,187 B1
(45) Date of Patent: Jan. 7, 2003

(54) COMPUTING MULTIPLE ORDER-BASED FUNCTIONS IN A PARALLEL PROCESSING DATABASE SYSTEM

(75) Inventor: Ambuj Shatdal, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/457,253

(22) Filed: Dec. 8, 1999

(51) Int. Cl.[7] ............................................... G06F 17/30
(52) U.S. Cl. ................................. 707/2; 707/8
(58) Field of Search ............... 707/1–4, 7, 8

(56) References Cited

U.S. PATENT DOCUMENTS

| | | | | |
|---|---|---|---|---|
| 5,551,031 A | * | 8/1996 | Cheng et al. ................ | 707/2 |
| 5,557,791 A | * | 9/1996 | Cheng et al. ................ | 707/2 |
| 5,574,900 A | * | 11/1996 | Huang et al. ............... | 707/1 |
| 5,765,146 A | * | 6/1998 | Wolf et al. .................. | 707/2 |
| 5,797,000 A | * | 8/1998 | Bhattacharya et al. ..... | 707/2 |
| 5,884,299 A | * | 3/1999 | Ramesh et al. ............. | 707/2 |
| 6,009,265 A | * | 12/1999 | Huang et al. .............. | 395/600 |
| 6,067,542 A | * | 5/2000 | Carino, Jr. .................. | 707/4 |
| 6,092,062 A | * | 7/2000 | Lohman et al. ............. | 707/2 |
| 6,112,198 A | * | 8/2000 | Lohman et al. ............. | 707/3 |
| 6,345,267 B1 | * | 2/2002 | Lohman et al. ............. | 707/2 |

* cited by examiner

*Primary Examiner*—Maria N. Von Buhr
(74) *Attorney, Agent, or Firm*—Gates & Cooper

(57) ABSTRACT

A method, apparatus, and article of manufacture for computing a plurality of order-based analysis functions for rows stored in a table in a computer system, wherein the table has a plurality of partitions. A determination is made concerning which of the order-based analysis functions have compatible order-specifications. The order-based analysis functions with the compatible order-specification are then performed simultaneously and in parallel against the partitions. Preferably, the computer system is a parallel processing database system, wherein each of its processing units manages a partition of the table, and the order-based analysis functions can be performed in parallel by the processing units.

51 Claims, 5 Drawing Sheets

COMPUTING MULTIPLE ORDER-BASED FUNCTIONS IN A PARALLEL PROCESSING DATABASE SYSTEM

BACKGROUND OF THE INVENTION

1. Field of the Invention

This invention relates in general to database management systems performed by computers, and in particular, to computing multiple order-based functions in a parallel processing database system.

2. Description of Related Art

Relational DataBase Management Systems (RDBMS) are well known in the art. In an RDBMS, all data is externally structured into tables. A table is a two dimensional entity, consisting of rows and columns. Each column has a name, typically describing the type of data held in that column. As new data is added, more rows are inserted into the table.

Structured Query Language (SQL) statements allow users to formulate relational operations on the tables. One of the most common SQL statements executed by an RDBMS is to generate a result set from one or more combinations of one or more tables (e.g., through joins) and other functions.

Often, it is desirable to perform order-based analysis functions, such as Rank, Percentile, Moving Average, Cumulative Total, etc., on one or more sets of rows (specified by a grouping) in a table residing in the relational database. These functions generally fall into two categories:

1. Global functions, such as Rank, Percentile, and Cumulative Total, where the function value depends on the rows previously accessed (and their order).
2. Moving functions, such as Moving Average, where the function value depends on a "window" (or a well-defined ordered subset) of the ordered set of rows.

However, problems exist in performing order-based analysis functions on one or more sets of rows in a table residing in a relational database. In most RDBMS, such functions cannot be done at all, and hence the data has to be extracted out of the RDBMS and the function performed outside the RDBMS on a client computer or a middle-tier server.

There are many problems with this approach. For example, these prior art techniques do not take advantage of the functionality of the RDBMS, much less the parallelism and resources of a parallel processing database system. In addition, the data has to be extracted from the system, which wastes resources. Further, the single processing unit, client, or other uni-processor system is usually unable to handle large amounts of data efficiently, when at the same time, the resources of the parallel processing database system are not being used effectively.

Thus, there is a need in the art for improved computations of multiple order-based functions, especially in a parallel processing database system.

SUMMARY OF THE INVENTION

The present invention discloses a method, apparatus, and article of manufacture for computing a plurality of order-based analysis functions for rows stored in a table in a computer system, wherein the table has a plurality of partitions. A determination is made concerning which of the order-based analysis functions have compatible order-specifications. The order-based analysis functions with the compatible order-specification are then performed simultaneously and in parallel against the partitions. Preferably, the computer system is a parallel processing database system, wherein each of its processing units manages a partition of the table, and the order-based analysis functions can be performed in parallel by the processing units.

An object of the present invention is to provide order-based analysis functions in a relational database management system. Another object is to optimize the computation of order-based analysis functions on parallel processing computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention performs order-based analysis functions in a parallel processing database system. The functions are analyzed to determine which of the order-based analysis functions have compatible order-specifications, and the order-based analysis functions with the compatible order-specification are performed simultaneously and in parallel against multiple partitions of a database by multiple processing units.

Several data partitioning strategies may be used, including hash partitioning, range partitioning, and no partitioning (i.e., local processing). Cooperation between the data partitioning strategies is provided when functions with different order-specifications need to be evaluated. A dynamic switch-over of the data partitioning strategy can be performed when a prior analysis (based on estimates) is inaccurate.

There are several advantages to this approach. For example, the system computes many such functions simultaneously, if they have compatible order-specifications. Moreover, a large portion of the work can be shared, even if the functions do not have compatible order-specifications. In addition, most of the processing can occur independently on multiple processing units.

As a result, these innovative concepts extend and enhance a scalable parallel processing database system for the computation of order-based analysis functions. Applications can analyze data in new and meaningful ways in a closely integrated fashion. Order-based analysis functions can be invoked using extensions for Structured Query Language (SQL) statements. Order-based analysis functions can also be used as table-expressions, where the result values of the functions can be further analyzed or stored back in the database.

ENVIRONMENT

Figure 1:
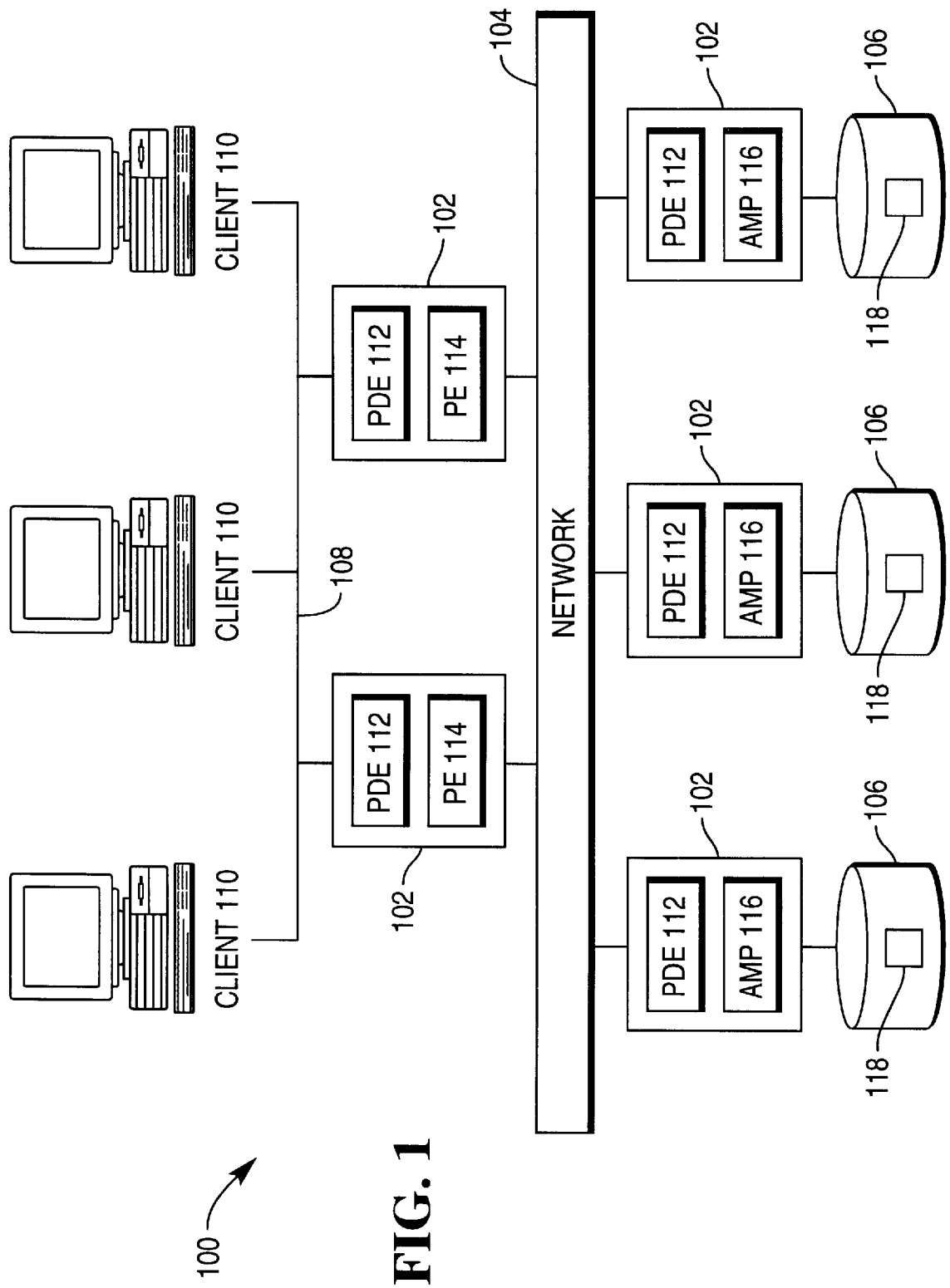
FIG. 1 illustrates an exemplary software and hardware environment that could be used with the present invention.

FIG. 1 illustrates an exemplary hardware and software environment that could be used with the present invention.

In the exemplary environment, a computer system 100 is comprised of one or more processing units (PUs) 102, also known as processors or nodes, which are interconnected by a network 104. Each of the PUs 102 is coupled to zero or more fixed and/or removable data storage units (SUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by Relational DataBase Management System (RDBMS) software executed by the system 100.

In the preferred embodiment of the present invention, the RDBMS software comprises the Teradata® product offered by NCR Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS software across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a unit of work into smaller sub-units, each of which can be assigned to an AMP 116. In the preferred embodiment, data partitioning and repartitioning is performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign rows to AMPs 116, wherein the hashing function generates a hash "bucket" number and the hash bucket numbers are mapped to AMPs 116. Range partitioning is a partitioning scheme in which each AMP 116 manages the rows falling within a range of values, wherein the entire data set is divided into as many ranges as there are AMPs 116. No partitioning means that a single AMP 116 manages all of the rows.

Generally, the RDBMS comprises logic and/or data that is tangibly embodied in and/or accessible from a device, media, carrier, or signal, such as RAM, ROM, one or more of the DSUs 106, and/or a remote system or device communicating with the computer system 100 via one or more of the DCUs 108. The logic and/or data when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

OPERATION OF THE PREFERRED EMBODIMENT

The preferred embodiment of the present invention performs order-based analysis functions in a parallel processing computer system 100. A function request is specified for a given set of parameters that vary depending on the function, but which always include the order-specification. For example, a Rank function only requires an order-specification, while a Moving Average function requires an expression for which the moving average is being computed, the size of the moving window, and the order-specification.

The function requests may specify that rows from one or more tables in the database 118 be grouped by one or more grouping expressions. Each group, defined by the grouping expression and comprising rows that have the same value, then defines the scope for the computation of the function. In the absence of a grouping specification, the scope of the function comprises the entire table.

The order-based analysis function are then performed in two phases: (1) an analysis phase and (2) an evaluation phase. In the analysis phase, the RDBMS determines which of the order-based analysis functions have compatible order-specifications. In the evaluation phase, the RDBMS performs the order-based analysis functions with the compatible order-specification simultaneously and in parallel against one or more tables in the database 118 that may or may not be partitioned across multiple PUs 102 in the parallel processing computer system 100. Functions with different or non-compatible order-specifications may be performed similarly, one order-specification after another in a cooperative fashion.

The output resulting from the function request is a set of rows having the computed function values defined by the function request.

Analysis Phase

The Analysis Phase determines what functions can be evaluated simultaneously, what is the best way to evaluate the functions in parallel, and how the processing of functions with different order-specifications will occur. In the preferred embodiment, this phase would be performed by a single PU 102, although other embodiments could use multiple PUs 102.

Initially, the requested functions are analyzed to break the functions into groups of functions that can be evaluated simultaneously.

Except for the Rank function, order-specifications are considered compatible when one is a left subset of the other. An ordered set of values (e.g., [A, B, C]) is a left subset of another ordered set of values (e.g., [A, B, C, D]) when all the values from the former are identical to the values of the latter in left to right order (i.e., most significant to least significant).

For the Rank function, it depends on the semantics. Generally, order-specifications are compatible when they are the same. Specifically, if the values are assigned a different rank (i.e., the tie is broken arbitrarily), then the same definition can be used. However, if equal values are the same rank then only functions with identical order-specifications can be considered compatible.

Aggregate functions can be computed simultaneously with any other function.

The number of groups are then compared to the number of available PUs 102 on the parallel processing computer system 100. This comparison is performed in order to determine which type of partitioning should be used, i.e., range partitioning, hash partitioning, or no partitioning (where the rows remain on the local PU 102).

In order to compute the functions, every set of rows (determined by the grouping values) has to be sorted. In general, this implies that the entire input table may have to be globally sorted. This can be done using range based partitioning of the input on the composite <grouping expression, order specification> and then sorting the locally resident data.

However, when the number of groups is large, an even distribution of the groups would be sufficient to achieve good parallel performance. Hence, the rows can be partitioned by hashing on the grouping expression and a global sort using range partitioning does not have to be performed. Furthermore, when the number of rows is small, hash partitioning can be used as the overhead of range partitioning may be more than the benefit derived.

These tradeoffs are reflected in a cost-based analysis of the options described below:

| Cost Terms | Meaning |
| --- | --- |
| RelSz | Size of the relation (table) |
| NumberOfPUs | Number of PUs 102 |
| ReadCost | Cost of reading a row |
| RedistCost | Cost of redistributing a row |
| RedistSkew | Explained below in detail |
| WriteCost | Cost of writing a row back to a DSU 106 |
| SortCost | Per row cost of sorting the table |
| ScanCost | Per row cost of scanning the sorted table |
| NumberOfGroups | Number of groups |
| FudgeFactor | Estimation Error factor |
| SamplingCost | Cost of sampling the table |
| On-the-fly-aggregateCost | Cost per row of calculating on-the-fly aggregates |
| PostProcessingCost | Cost of assembling needed values from the on-the-fly aggregates and copying rows |

Cost of Hash Partitioning=
(RelSz/NumberOfPUs)*(ReadCost+RedistCost)+
((RelSz/NumberOfPUs)*RedistSkew)*(WriteCost+
SortCost+ScanCost)

RedistSkew represents the case that a PU 102 may get no rows at all, as there are no groups assigned to it. As is evident, when the number of groups is smaller than the number of PUs 102, then, when a hash partitioning is performed on the grouping expression, there will be PUs 102 with no rows on them Actually, even when there are a few more groups than the PUs 102, there might be PUs 102 with no groups assigned to them, because of hash assignment.

Since this is a fairly complex computation, for simplicity it is approximated as:

If NumberOfGroups<NumberOfPUs
RedistSkew=(NumerOfPUs/NumberOfGroups)
*FudgeFactor If NumberOfGroups between 1 and 10 times NumberOfPUs
RedistSkew=FudgeFactor Otherwise RedistSkew=1 (i.e., uniformity assumption)

A further advantage of hash partitioning is that, if there are other functions with different order specifications, the other functions can be processed without any redistribution. The cost of processing subsequent order specifications, if any, is simply.

Cost with locally resident data=
((RelSz/NumberOfPUs)*RedistSkew)*(SortCost+
ScanCost)

In contrast to hash partitioning, range partitioning has more overhead but does not suffer from RedistSkew, because all rows are more-or-less evenly distributed across the PUs 102:

Cost of Range Partitioning=
SamplingCost+
(RelSz/NumberOfPUs)*(ReadCost+RedistCost)+
(RelSz/NumberOfPUs)*(On-the-fly-aggregateCost+
WriteCost+SortCost+ScanCost)+
PostProcessingCost Here, the SamplingCost and PostProcessingCosts are fixed costs fairly independent of the number of rows, groups or PUs 102. On-the-fly-aggregateCost is a small CPU (no I/O) cost. However, subsequent order specifications, if any, will also need to be range partitioned in this case.

In general, comparing the cost of repartitioning using the two approaches matches the intuition that, when the number of rows is small (i.e., sampling and post-processing cost may dominate) or when number of groups is large (i.e., compared to number of processing units), then hash partitioning should be used; otherwise, range partitioning should be used.

Thereafter, the functions are performed in parallel for one order-specification. If there are additional functions (with different order-specifications), then those are performed one set after the other.

Evaluation Phase

The evaluation phase determines how the functions for one order-specification can be evaluated efficiently in parallel by multiple PUs 102.

If range partitioning is being used (according to the Analysis Phase), then the PU 102 needs to determine the ranges that are to be used for the partitioning of the data. To determine the ranges, the PU 102 samples and analyzes at least some of the input table.

If it is determined that the Analysis Phase was inaccurate, and that the data should be hash partitioned, the PU 102 changes the partitioning scheme and sets the "switch-tolocal" flag. This flag informs following invocations of the Evaluation Phase (for different order-specifications) to switch to local, i.e., no partitioning, without the need to sample and analyze the rows.

However, if range partitioning is still being used, the ranges are determined and used to redistribute the data. In this redistribution, upon receiving the redistributed rows, aggregates are computed for the first and last groups on that PU 102. These aggregates are used in computing values necessary for fast computation of Global and Aggregate functions. On the other hand, if hash partitioning is being used, then predefined hash functions and mapping are used to redistribute the data. In all cases, the (re-distributed) input rows are sorted on a composite sort key comprised of <grouping expressions, order-specification>.

If range partitioning is being used, then it is also necessary to compute Global, Aggregate, and Moving information that would be needed so that the processing of rows can proceed independently on all of the PUs 102. For Global functions, aggregate values are computed for data on previous PUs 102. For Aggregate functions, the final aggregate values for the first and last group on the PU 102 are needed, as the rows belonging to these groups maybe on other PUs 102. Finally, for Moving functions, it is necessary to replicate as many rows as necessary onto the previous PU 102, so that the PUs 102 can compute values for all rows independently.

Thereafter, a loop is performed to read the rows. As each row is read, the resulting output is constructed. If the row belongs to the same group as the previous row, then the function values are updated, e.g., for Global functions, this requires "adding" the new row, while for Moving functions, this requires "adding" the new row and "deleting" the trailing row, if the moving window is full. If the row does not belong to the same group as the previous row, then the function values are re-initialized using the new row (and other data as necessary). When all the rows are read and processed, then the Evaluation Phase is complete.

LOGIC OF THE PARALLEL ORDER-BASED FUNCTIONS

Figure 2:
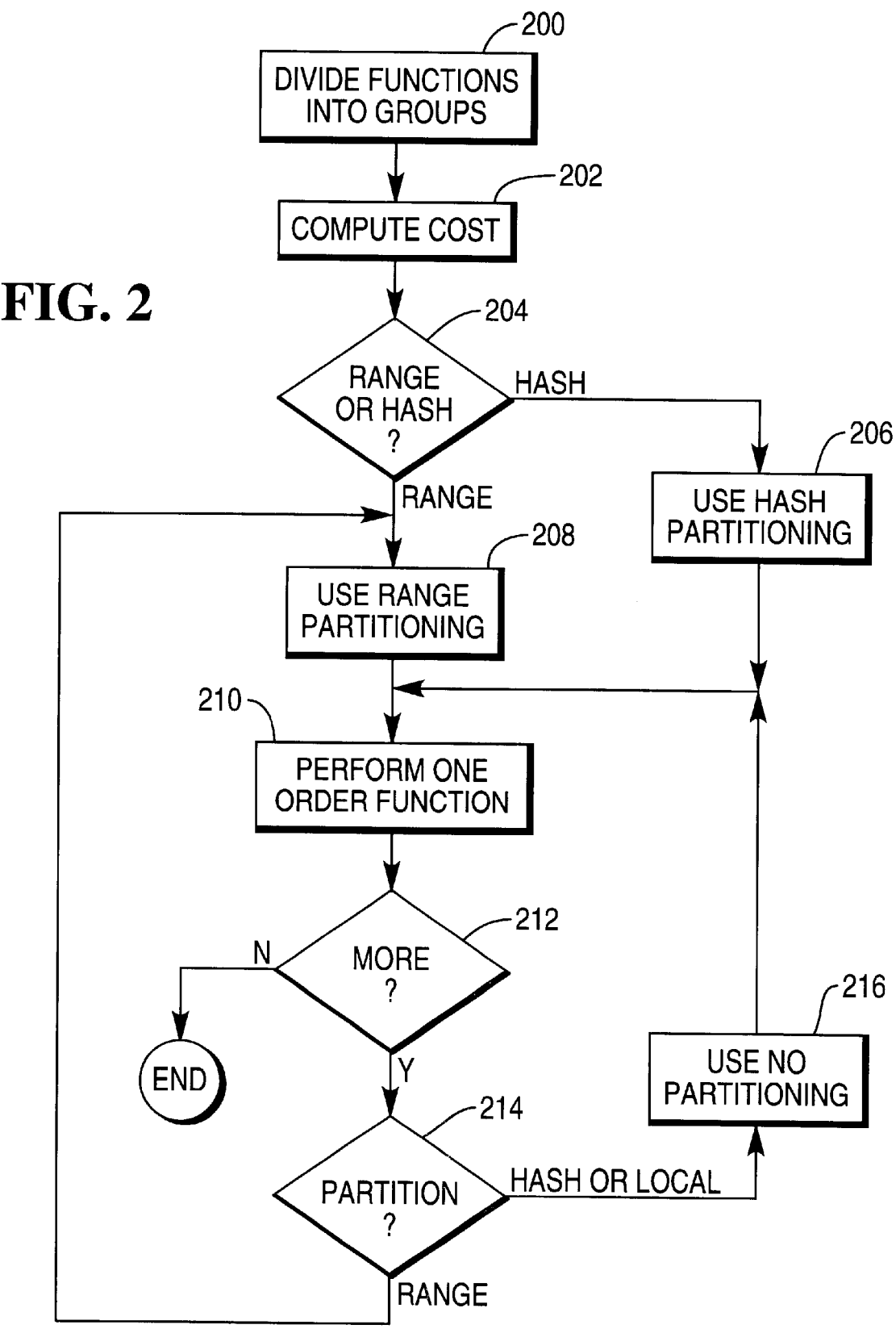
FIG. 2 is a flow chart illustrating the logic performed according to the preferred embodiment of the present invention.

FIG. 2 is a flowchart that illustrates the logic performed in the analysis phase according to the preferred embodiment of the present invention.

Block 200 represents the PU 102 dividing functions into groups that can be evaluated together. Except for the Rank function, order-specifications are considered compatible when one is a left subset of the other. For the Rank function, order-specifications are compatible when they are identical.

Block 202 represents the PU 102 determining the cost of hash and range partitioning, as described above.

Block 204 is a decision block that represents the PU 102 determining whether range or hash partitioning should be used, based on the computed cost determined in Block 202. If range partitioning is to be used, then control transfers to Block 208; otherwise, if hash partitioning is to be used, then control transfers to Block 206.

Block 206 represents the PU 102 selecting hash partitioning for the rows.

Block 208 represents the PU 102 selecting range partitioning for the rows.

Block 210 represents the PUs 102 processing the functions in parallel for one order-specification. This is further described in FIGS. 3A, 3B, and 3C.

Block 212 is a decision block that represents the PU 102 determining whether there are any more functions (with different order-specifications) to be performed. If so, control transfers to Block 214; otherwise, the logic terminates.

Block 214 is a decision block that represents the PU 102 determining whether the partitioning for the previous step was range partitioning. If so, control transfers to Block 216; otherwise, control transfers to Block 208.

Block 216 represents the PU 102 selecting no partitioning (i.e., local processing) for the rows.

Figure 3A:
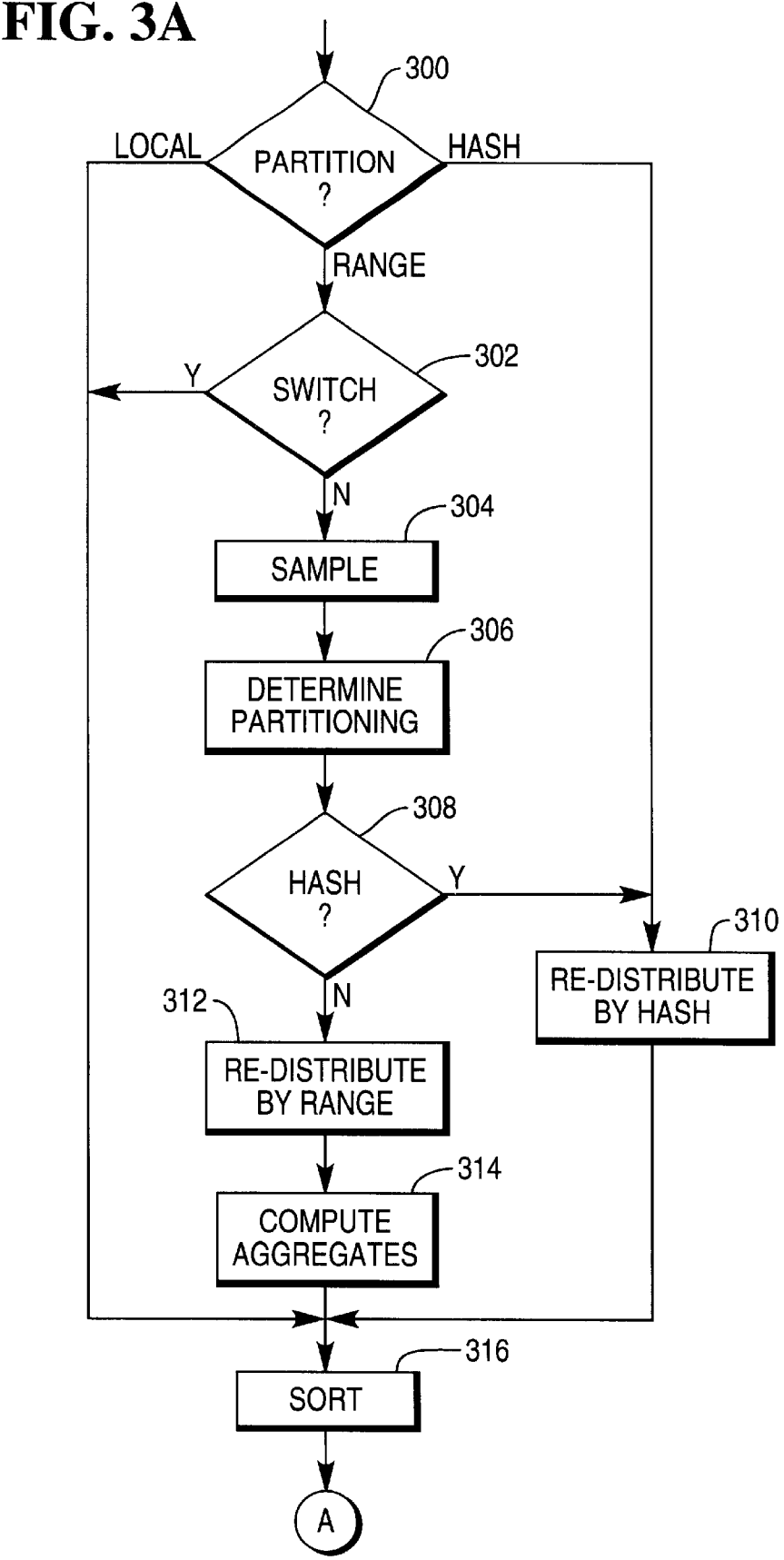
FIGS. 3A, 3B, and 3C together are a flow chart illustrating the logic performed according to the preferred embodiment of the present invention.
Figure 3B:
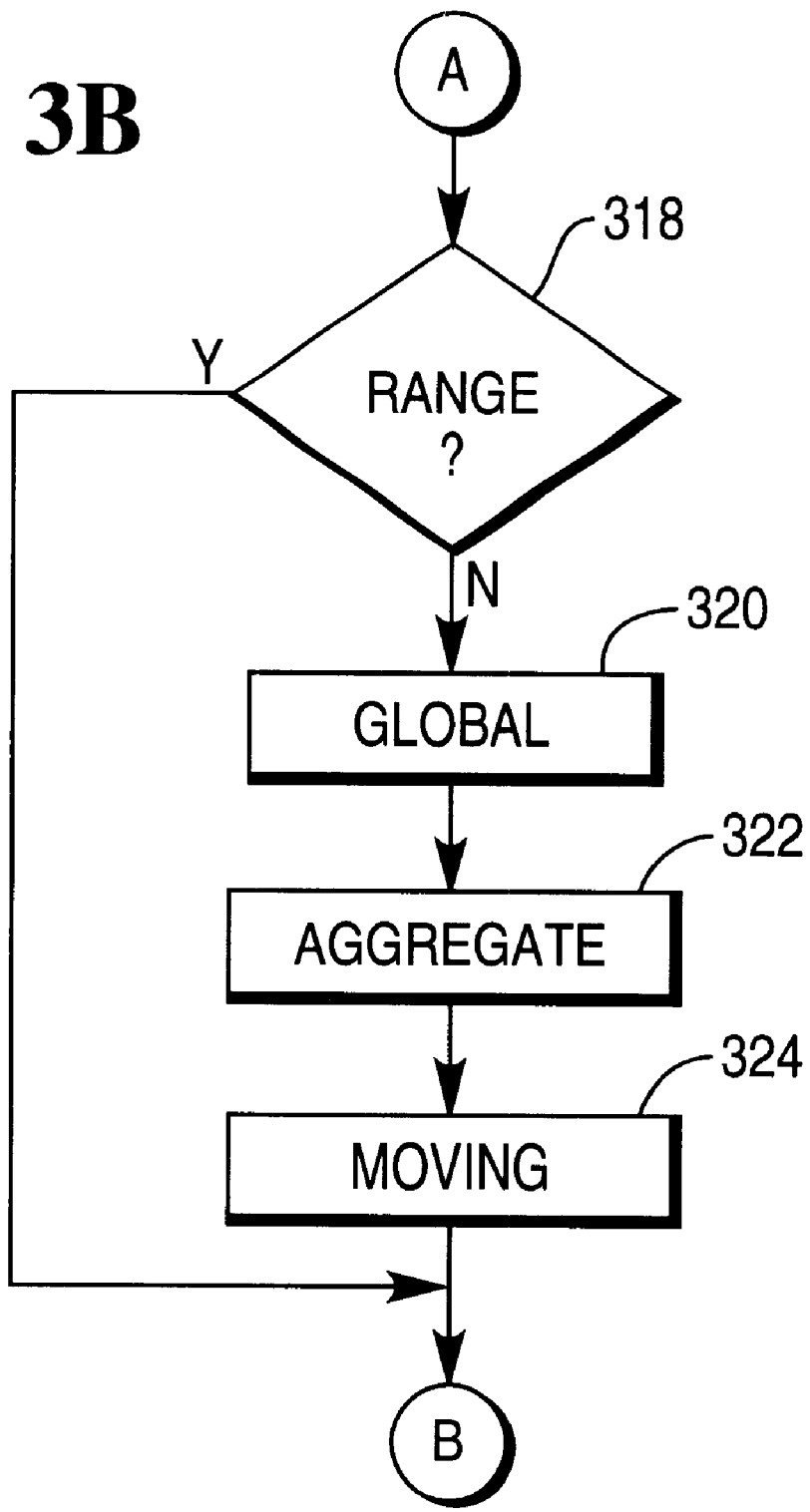
Figure 3C:
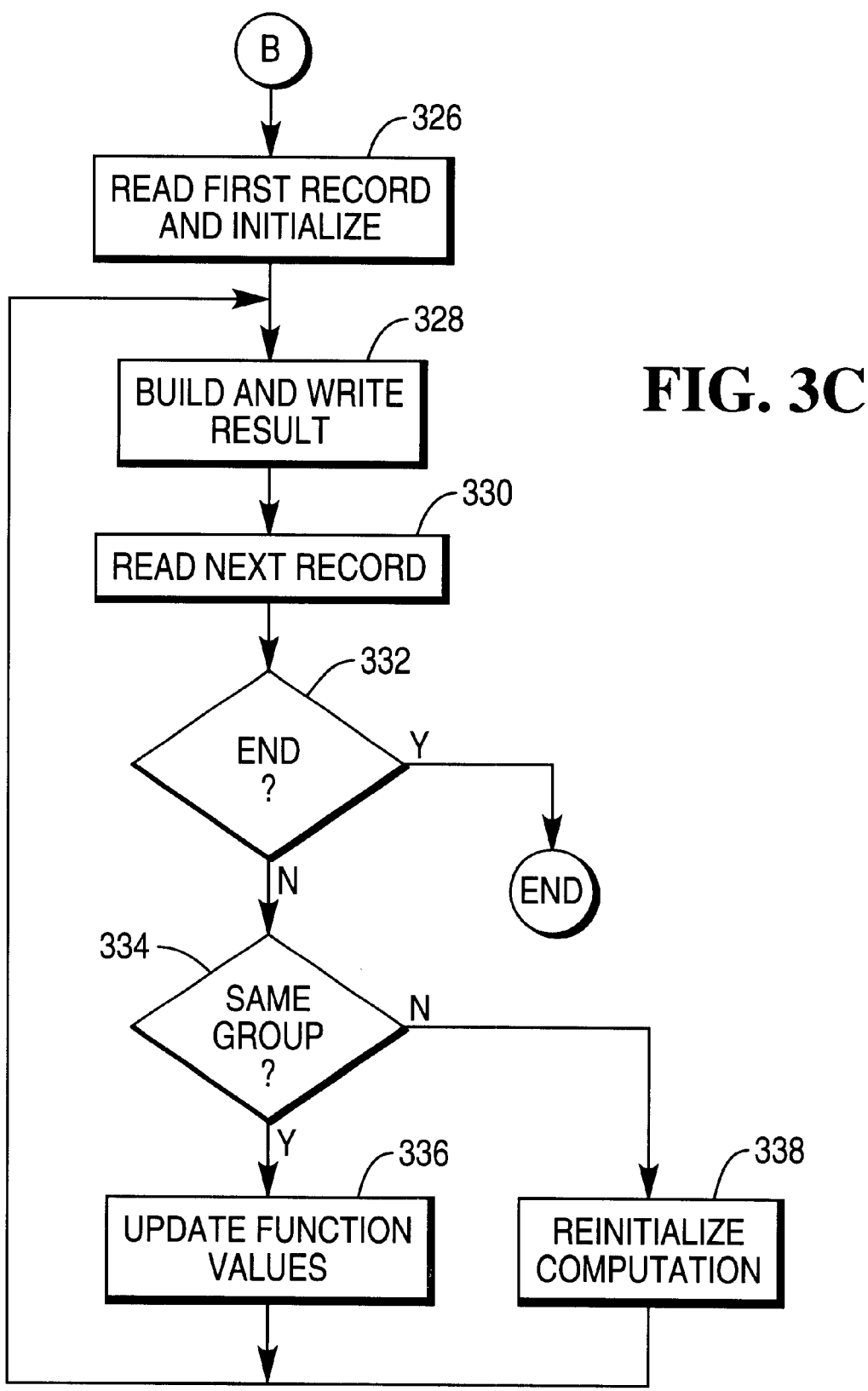

FIGS. 3A, 3B, and 3C together are a flowchart that illustrates the logic performed in the evaluation phase according to the preferred embodiment of the present invention.

Referring to FIG. 3A, Block 300 is a decision block that represents the PU 102 determining whether the partitioning is range, hash, or no partitioning (i.e., local). If the partitioning is range, control transfers to Block 302; otherwise, if the partitioning is hash, control transfers to Block 310; otherwise, if there is no partitioning (i.e., local), control transfers to Block 316.

Block 302 is a decision block that represents the PU 102 determining whether a decision was made previously to switch to local, i.e., no partitioning. If not, control transfers to Block 304; otherwise, control transfers to Block 316.

Block 304 represents the PU 102 obtaining a sample of the input and sending the sample to a designated PU 102.

Block 306 represents the designated PU 102 analyzing the samples sent to it to determine whether range or hash partitioning should be used.

Block 308 is a decision block that represents the PU 102 determining whether a decision was made to use hash partitioning. If so, control transfers to Block 310; otherwise, control transfers to Block 312.

Block 310 represents the PU 102 partitioning the rows by hashing on the grouping expression. Thereafter, control transfers to Block 316.

Block 312 represents the PU 102 partitioning the rows according to the range partitioning table.

Block 314 represents the PU 102 computing aggregates for the first and last group before storing the re-partitioned data.

Block 316 represents the PU 102 sorting the data by the composite sort key comprised of <grouping expression, order-specification>.

Thereafter, control transfers to Block 318 in FIG. 3B via "A".

Referring to FIG. 3B, Block 318 is a decision block that represents the PU 102 determining whether range partitioning is being used. If not, control transfers to Block 320; otherwise, control transfers to Block 326 in FIG. 3C via "B".

Block 320 represents the PU 102, for Global functions, computing aggregate values for data on previous PUs 102.

Block 322 represents the PU 102, for Aggregate functions, computing final aggregate values for the first and last groups on the PU 102.

Block 324 represents the PU 102, for Moving functions, replicating sufficient rows on to the previous PU 102, so that each PU 102 can be independent.

Thereafter, control transfers to Block 326 in FIG. 3C via "B".

Referring to FIG. 3C, Block 326 represents the PU 102 reading the first row and then initializing the computation. The computation is initialized using data from Blocks 320–324, if range partitioning is used; otherwise, the computation is initialized using data computed in FIG. 2, if aggregate functions are being computed.

Block 328 represents the PU 102 building and writing the result row.

Block 330 represents the PU 102 reading the next row.

Block 332 is a decision block that represents the PU 102 determining whether the end of the input has been reached. If so, the logic terminates; otherwise, control transfers to Block 334.

Block 334 is a decision block that represents the PU 102 determining whether the row belongs to the same group as the previous row. If so, control transfers to Block 336; otherwise, control transfers to Block 338.

Block 336 represents the PU 102 updating the function values: (1) for Global functions, "adding" the new row, or (2) for Moving functions, "adding" the new rows and "deleting" the trailing row, if the moving window is full.

Block 336 represents the PU 102 reinitializing the computation using the new row (and using data from Block 322, if range partitioning is used).

Thereafter, control returns to Block 328.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any DBMS or other program that performs similar functions.

In another alternative embodiment, the partitions of the table need not be spread across separate data storage devices. Instead, the partitions could be stored on one or a few data storage devices simply to minimize the amount of temporary data storage required at each of the steps of the method.

In yet another alternative embodiment, the steps or logic could be performed by more or fewer processors, rather than the designated and other processors as described above. For example, the steps could be performed simultaneously on a single processor using a multi-tasking operating environment.

In summary, the present invention discloses a method, apparatus, and article of manufacture for computing a plurality of order-based analysis functions for rows stored in a table in a computer system, wherein the table has a plurality of partitions. A determination is made concerning which of the order-based analysis functions have compatible order-specifications. The order-based analysis functions with the compatible order-specification are then performed simultaneously and in parallel against the partitions. Preferably, the computer system is a parallel processing database system, wherein each of its processing units manages a partition of the table, and the order-based analysis functions can be performed in parallel by the processing units.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for computing a plurality of order-based analysis functions for rows stored in a table in a computer system, wherein the table has a plurality of partitions, the method comprising:

(a) determining which of the order-based analysis functions have compatible order-specifications; and (b) performing the order-based analysis functions with the compatible order-specification simultaneously and in parallel against the partitions.

2. The method of claim 1, wherein the computer system has a plurality of processing units, each of the processing units manages a partition of the table, and multiple ones of the performing step (b) are performed simultaneously and in parallel by the processing units.

3. The method of claim 1, wherein the determining step (a) comprises an analysis phase.

4. The method of claim 1, wherein the performing step (b) comprises an evaluation phase.

5. The method of claim 1, further comprising performing the order-based analysis functions with non-compatible order-specifications sequentially in a cooperative manner against the partitions.

6. The method of claim 1, wherein the determining step (a) comprises identifying order-specifications as being compatible when a first one of the order-specifications is a left subset of a second one of the order-specifications.

7. The method of claim 1, wherein the determining step (a) comprises identifying order-specifications as being compatible when the order-based analysis functions is a Rank function and the order-specifications are identical.

8. The method of claim 1, further comprising performing aggregate functions simultaneously with the order-based analysis functions.

9. The method of claim 1, wherein the partitions are selected from a group of partitions comprising range partitions, hash partitions, and no partitions.

10. The method of claim 9, wherein the order-based analysis functions specify that the table be grouped by one or more grouping expressions.

11. The method of claim 10, wherein a group defined by one of the grouping expressions defines a scope for the order-based analysis function.

12. The method of claim 11, further comprising selecting a partitioning method for the table based on a cost comparison of a plurality of partitioning methods.

13. The method of claim 12, further comprising selecting a hash partitioning for the table when there is a grouping specification and there are enough groups so that each processing unit can process a balanced number of rows in the table.

14. The method of claim 12, further comprising selecting a range partitioning for the table when there is a grouping specification and there are few groups as compared to rows in the table.

15. The method of claim 14, wherein the range partitioning partitions the table using a range identified by a composite sort key comprised of the group expressions and the order-specification.

16. The method of claim 12, further comprising re-partitioning the table using a different partitioning method for the table if the determining step was inaccurate.

17. The method of claim 16, further comprising setting a flag after re-partitioning the table to indicate that subsequently performed order-based analysis functions should not re-partition the table.

18. An apparatus for computing a plurality of order-based analysis functions for rows stored in a table in a computer system, wherein the table has a plurality of partitions, comprising:

(a) a computer system having one or more data storage devices coupled thereto, wherein the data storage devices store at least one table, and the table has a plurality of partitions;
(b) logic, performed by the computer system, for:
  (1) determining which of the order-based analysis functions have compatible order-specifications; and
  (2) performing the order-based analysis functions with the compatible order-specification simultaneously and in parallel against the partitions.

19. The apparatus of claim 18, wherein the computer system has a plurality of processing units, each of the processing units manages a partition of the table, and multiple ones of the performing logic (2) are performed simultaneously and in parallel by the processing units.

20. The apparatus of claim 18, wherein the logic for determining (1) comprises an analysis phase.

21. The apparatus of claim 18, wherein the logic for performing (2) comprises an evaluation phase.

22. The apparatus of claim 18, further comprising logic for performing the order-based analysis functions with non-compatible order-specifications sequentially in a cooperative manner against the partitions.

23. The apparatus of claim 18, wherein the logic for determining (1) comprises logic for identifying order-specifications as being compatible when a first one of the order-specifications is a left subset of a second one of the order-specifications.

24. The apparatus of claim 18, wherein the logic for determining (1) comprises identifying order-specifications as being compatible when the order-based analysis functions is a Rank function and the order-specifications are identical.

25. The apparatus of claim 18, further comprising logic for performing aggregate functions simultaneously with the order-based analysis functions.

26. The apparatus of claim 18, wherein the partitions are selected from a group of partitions comprising range partitions, hash partitions, and no partitions.

27. The apparatus of claim 26, wherein the order-based analysis functions specify that the table be grouped by one or more grouping expressions.

28. The apparatus of claim 27, wherein a group defined by one of the grouping expressions defines a scope for the order-based analysis function.

29. The apparatus of claim 28, further comprising logic for selecting a partitioning method for the table based on a cost comparison of a plurality of partitioning methods.

30. The apparatus of claim 29, further comprising logic for selecting a hash partitioning for the table when there is a grouping specification and there are enough groups so that each processing unit can process a balanced number of rows in the table.

31. The apparatus of claim 29, further comprising logic for selecting a range partitioning for the table when there is a grouping specification and there are few groups as compared to rows in the table.

32. The apparatus of claim 31, wherein the range partitioning partitions the table using a range identified by a composite sort key comprised of the group expressions and the order-specification.

33. The apparatus of claim 29, further comprising logic for re-partitioning the table using a different partitioning method for the table if the determining step was inaccurate.

34. The apparatus of claim 33, further comprising logic for setting a flag after re-partitioning the table to indicate that subsequently performed order-based analysis functions should not re-partition the table.

35. An article of manufacture embodying logic for computing a plurality of order-based analysis functions for rows stored in a table in a computer system, wherein the table has a plurality of partitions, the method comprising:
  (a) determining which of the order-based analysis functions have compatible order-specifications; and
  (b) performing the order-based analysis functions with the compatible order-specification simultaneously and in parallel against the partitions.

36. The method of claim 35, wherein the computer system has a plurality of processing units, each of the processing units manages a partition of the table, and multiple ones of the performing step (b) are performed simultaneously and in parallel by the processing units.

37. The method of claim 35, wherein the determining step (a) comprises an analysis phase.

38. The method of claim 35, wherein the performing step (b) comprises an evaluation phase.

39. The method of claim 35, further comprising performing the order-based analysis functions with non-compatible order-specifications sequentially in a cooperative manner against the partitions.

40. The method of claim 35, wherein the determining step (a) comprises identifying order-specifications as being compatible when a first one of the order-specifications is a left subset of a second one of the order-specifications.

41. The method of claim 35, wherein the determining step (a) comprises identifying order-specifications as being compatible when the order-based analysis functions is a Rank function and the order-specifications are identical.

42. The method of claim 35, further comprising performing aggregate functions simultaneously with the order-based analysis functions.

43. The method of claim 35, wherein the partitions are selected from a group of partitions comprising range partitions, hash partitions, and no partitions.

44. The method of claim 43, wherein the order-based analysis functions specify that the table be grouped by one or more grouping expressions.

45. The method of claim 44, wherein a group defined by one of the grouping expressions defines a scope for the order-based analysis function.

46. The method of claim 44, further comprising selecting a partitioning method for the table based on a cost comparison of a plurality of partitioning methods.

47. The method of claim 46, further comprising selecting a hash partitioning for the table when there is a grouping specification and there are enough groups so that each processing unit can process a balanced number of rows in the table.

48. The method of claim 46, further comprising selecting a range partitioning for the table when there is a grouping specification and there are few groups as compared to rows in the table.

49. The method of claim 48, wherein the range partitioning partitions the table using a range identified by a composite sort key comprised of the group expressions and the order-specification.

50. The method of claim 46, further comprising re-partitioning the table using a different partitioning method for the table if the determining step was inaccurate.

51. The method of claim 50, further comprising setting a flag after re-partitioning the table to indicate that subsequently performed order-based analysis functions should not re-partition the table.

* * * * *